United States Patent [19]

Jessen

[11] Patent Number: 4,897,322

[45] Date of Patent: Jan. 30, 1990

[54] METHOD FOR PREVENTING OVERHEATING OF HIGH-TEMPERATURE STORAGE BATTERIES

[75] Inventor: Jens-Christian Jessen, Eppelheim, Fed. Rep. of Germany

[73] Assignee: Asea Brown Bovery Aktiengesellschaft, Mannheim, Fed. Rep. of Germany

[21] Appl. No.: 255,888

[22] Filed: Oct. 11, 1988

[30] Foreign Application Priority Data

Oct. 9, 1987 [DE] Fed. Rep. of Germany ....... 3734221

[51] Int. Cl.$^4$ ............................................. H01M 10/50
[52] U.S. Cl. ...................................... 429/62; 429/120; 429/50; 320/35
[58] Field of Search ........................... 429/62, 120, 50; 320/35

[56] References Cited

U.S. PATENT DOCUMENTS

| | | | |
|---|---|---|---|
| 4,011,366 | 3/1977 | Bones et al. | 429/62 X |
| 4,376,809 | 3/1983 | Bindin | 429/62 |
| 4,497,879 | 2/1985 | Lucke et al. | 429/62 |
| 4,727,006 | 2/1988 | Malinowski et al. | 429/62 X |

FOREIGN PATENT DOCUMENTS 58-112273  7/1983  Japan .................... 429/62

Primary Examiner—Stephen J. Kalafut
Attorney, Agent, or Firm—Herbert L. Lerner; Laurence A. Greenberg

[57] ABSTRACT

In conventional high-temperature storage batteries, cooling systems of very large dimension are provided to prevent overheating of the storage cells even when maximum power is being delivered. The object of the invention is to provide a method which makes it possible to equip high-temperature storage batteries with cooling systems which are of smaller dimension and with which any overheating of the storage cells is ruled out. According to the invention, at the permissible internal temperature the current having a heat loss which produces the internal temperature is determined while taking the parameters associated with the high-temperature storage battery into account. The internal temperature is continuously measured during the delivery of the current. The cooling system is switched on if the internal temperature rises above the permissible value. If a further increase in the internal temperature occurs, despite the activation of the cooling system, the power delivered by the high-temperature storage battery is reduced. Once the internal temperature has fallen again to a specified minimum value which, however, need not be lower than the working temperature of the storage cells, the current limitation is removed and the cooling system is switched off.

7 Claims, 1 Drawing Sheet

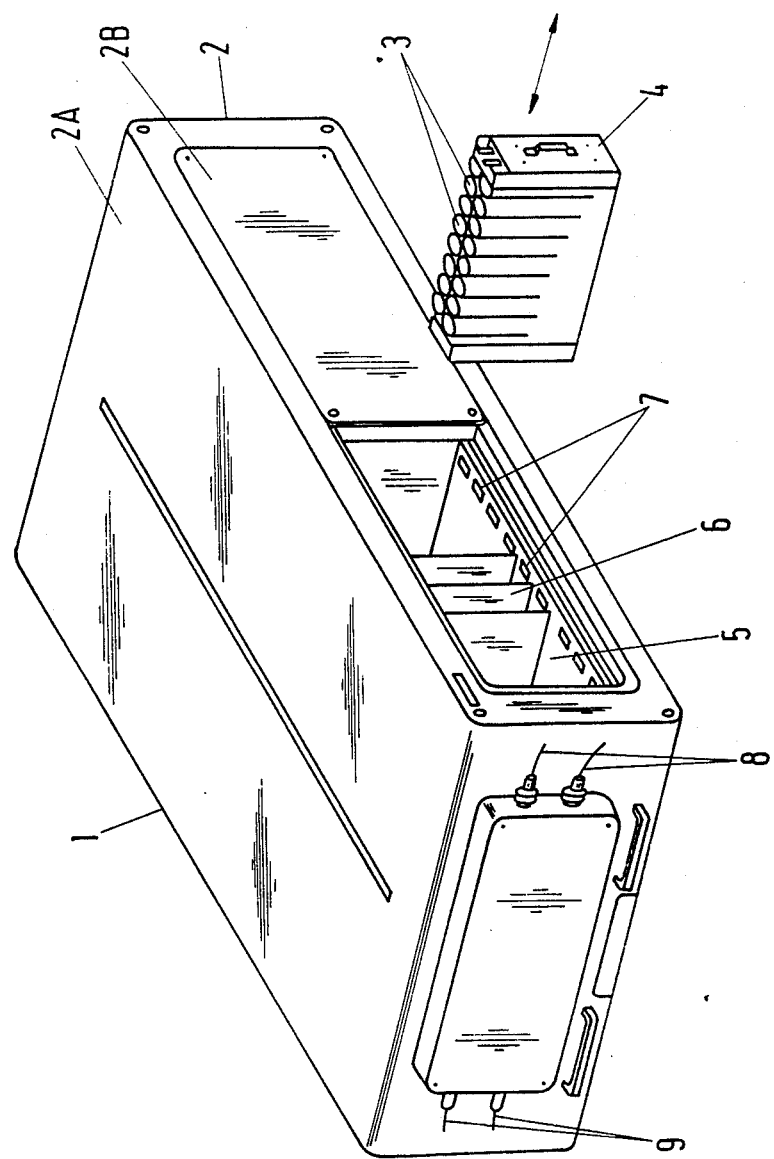

METHOD FOR PREVENTING OVERHEATING OF HIGH-TEMPERATURE STORAGE BATTERIES

The invention relates to a method for preventing overheating of high-temperature storage batteries.

Such high-temperature storage batteries, which are constructed by using rechargeable electrochemical storage cells, are being used to an increased extent for the electrical propulsion of vehicles.

The high-temperature storage batteries which have heretofore become known are constructed from a multiplicity of electrochemical storage cells. About 500 storage cells are necessary in order to form such high-temperature storage batteries which are intended to have an energy content of about 40 kWh. The storage cells contain sodium and sulphur as reactants and operate at a temperature of 350° C. In order to avoid heat losses, the storage cells are surrounded by thermal insulation. On the other hand, however, provisions must also be made for an adequate cooling of the storage cells so that the working temperature of the cells is not exceeded and any damage to the storage cells is prevented.

In the heretofore-known high-temperature storage batteries, the storage cells are preferably cooled by air which is conveyed past the storage cells or is conveyed through cooling channels which are disposed between the storage cells. In order to keep the internal temperature of the high-temperature storage batteries at the desired working temperature and to avoid the formation of hot points between the storage cells, the cooling systems used heretofore have been constructed substantially larger than necessary.

It is accordingly an object of the invention to provide a method for preventing overheating of a high-temperature storage battery, which overcomes the hereinafore-mentioned disadvantages of the heretofore-known methods of this general type and with which the specified internal temperature can be maintained with a cooling system having smaller dimensions.

With the foregoing and other objects in view there is provided, in accordance with the invention, a method for avoiding overheating of a high-temperature storage battery, which comprises continuously measuring the internal temperature of the storage battery, comparing the internal temperature with a desired first given temperature value, switching on a cooling system for maintaining the desired first given temperature value if the internal temperature rises to a second given temperature value, reducing the power delivered to the storage battery if the internal temperature increases further to a third given temperature value in order to limit the internal temperature, and first removing the power reduction and then switching off the cooling system when the internal temperature drops to the desired first given value.

The method is carried out in such a way that the cooling system is only actuated if the set point or desired value of the internal temperature is exceeded as a result of the power delivered.

In accordance with another mode of the invention, there is provided a method which comprises setting the desired first given value to correspond to a working temperature of storage cells of the storage battery. When a specified value of the internal temperature is reached, the latter can be prevented from increasing further by an additional limitation of the power to be delivered. This means, at the same time, that the limitation of the internal temperature and its restoration to the desired set point does not have to be effected by the cooling system alone. Consequently, it is possible to use a cooling system with smaller dimensions.

In accordance with a further mode of the invention, there is provided a method which comprises setting the desired first given value no higher than 350° C.

In accordance with an added mode of the invention, there is provided a method which comprises switching on the cooling device at a temperature at least as high as 350° C. in order to reduce the internal temperature.

In accordance with an additional mode of the invention, there is provided a method which comprises setting a maximum permissible internal temperature of 380° C. in the storage battery.

In accordance with yet another mode of the invention, there is provided a method which comprises setting the third given temperature value between 92 and 97% of a maximum permissible internal temperature in the storage battery.

In accordance with a concomitant mode of the invention, there is provided a method which comprises determining a maximum possible power once by calculation for the desired first given value, while taking the available cooling power and the thermal losses of the high-temperature storage battery into account after the storage battery has been manufactured.

Other features which are considered as characteristic for the invention are set forth in the appended claims.

Although the invention is illustrated and described herein as embodied in a method for preventing overheating of high-temperature storage batteries, it is nevertheless not intended to be limited to the details given, since various modifications may be made therein without departing from the spirit of the invention and within the scope and range of equivalents of the claims.

The method of operation of the invention, however, together with additional objects and advantages thereof will be best understood from the following description of specific embodiments when read in connection with the drawing.

The drawing is a diagrammatic perspective view of a high-temperature storage battery with which the method according to the invention is explained below.

Referring now in detail to the single figure of the drawing, there is seen a high-temperature storage battery 1 with a double-walled housing 2 and storage cells 3 which are assembled to form modules 4. Between an outer housing wall 2A and an inner housing wall 2B there is an evacuated space which is filled with a non-illustrated insulating material. An interior space 5 which is subdivided into individual sections with the aid of partitions 6 is provided inside the housing 2. Each section has at least one inlet 7 for air. Each module 4 contains a specified number of storage cells 3. One module 4 is disposed in each section of the interior space 5. Furthermore, lines 8 and 9 are provided through which cooling air is supplied and removed and external electrical connection is made to the storage cells 3. In the illustrated high-temperature storage battery, the air is introduced through the openings 7 into the interior space 5. The cooling air is conveyed back to the outside through further non-illustrated openings. The storage cells 3 operate at a temperature $T_A$ of 350° C. The temperature should only fall a small amount below or increase a small amount above the value $T_A$ so that the storage cells 3 always deliver an optimum power and are not damaged, for example, by an overheating. A set point or desired first given value $T_1$ of the internal temperature T is therefore likewise set at 350° C. When the high-temperature storage battery is being operated, its internal temperature T is determined by the heat loss of the current produced or the power delivered, as well as the heat removed by the cooling system and the thermal losses of the battery insulation. In order to ensure that the weight of the high-temperature storage batteries does not become too large, the batteries are equipped with cooling systems which have as small a construction as possible. In order to avoid an overheating of the high-temperature storage batteries with such cooling systems of small dimension, according to the invention, the current or the power which produces an internal temperature T of 350° C. is first calculated, taking into account the available cooling power and the thermal losses of the high-temperature storage battery 1. The current is calculated from the following equation:

$$I = \left[ \sqrt{\frac{EG^2}{4 \cdot Ri^2} + \frac{Pv + Pi + Pk}{Ri}} - \frac{EG}{2 \cdot Ri} \right] \cdot Zp \quad [A]$$

In the above equation, EG represents the entropy term, Ri the internal resistance (ohm) of the cell, Pi the thermal losses through the insulation, Pv the other thermal losses of the battery, Pk the heat removed by the cooling system and Zp the number of storage cells 3 connected in parallel.

When this calculated current or the associated power is delivered to a non-illustrated load which is connected to the high-temperature storage battery 1, the internal temperature T of the high-temperature storage battery is continuously measured. In the illustrated embodiment, it is assumed that the maximum permissible internal temperature $T_m$ of the high-temperature storage battery is 380° C. If the internal temperature T approaches a value of 350° C., which corresponds to the working temperature $T_A$ of the storage cell 3, the cooling system is switched on and cooling air is supplied to the storage cells 3 through the opening 7. The second given temperature $T_2$ at which the cooling is switched on is determined once for every type of battery and is 350° C. It may, however, also be somewhat higher. If it is found during measurements of the internal temperature T that the latter is rising above 350° C. and is approaching a third given temperature $T_3$ of 360° C., for example, the power delivered by the high-temperature storage battery is reduced. Then only a current is produced having a heat loss that produces an internal temperature which corresponds to the targeted value of the internal temperature $T_1$ of 350° C. This adjustment to a new current is made possible in a simple manner by determining the associated internal temperatures for several values of current taking the specific parameters of the high-temperature storage battery 1 as a basis, after the high-temperature storage battery 1 has been manufactured.

The reduced power adjusted in this way is maintained until the internal temperature T again has about 92% of its maximum value $T_m$. Once this condition has been reached, the cooling system is switched off again and the limitation on the power delivered is removed again.

As a result of this measure, it is possible to provide the high-temperature storage battery with a cooling system which has substantially smaller dimensions than the systems in conventional high-temperature storage batteries of this type. The continuous monitoring of the internal temperature T ensures that the temperature of the storage cells 3 does not fall below or increase above the value $T_A$ at all or only to a slight extent.

The foregoing is a description corresponding in substance to German Application P 37 34 221.5, dated Oct. 9, 1987, the International priority of which is being claimed for the instant application, and which is hereby made part of this application. Any material discrepancies between the foregoing specification and the aforementioned corresponding German application are to be resolved in favor of the latter.

I claim:

1. Method for avoiding overheating of a high-temperature storage battery having a cooling system for maintaining a desired internal temperature, which comprises determining the maximum possible power delivered by the storage battery once by calculation for a desired first given temperature value after the storage battery has been manufactured, while taking the available cooling power of the cooling system and the thermal losses of the high-temperature storage battery into account, continuously measuring the internal temperature of the storage battery during operation, comparing the internal the temperature with the desired first given temperature value, switching on the cooling system for maintaining the desired first given temperature value if the internal temperature rises to a second given temperature value, reducing the power delivered to the storage battery if the internal temperature increases further to a third given temperature value in order to limit the internal temperature, and first removing the power reduction and then switching off the cooling system when the internal temperature drops to the desired first given value.

2. Method according to claim 1, which comprises setting the desired first given value to correspond to a working temperature of storage cells of the storage battery.

3. Method according to claim 1, which comprises setting the desired first given value no higher than 350° C.

4. Method according to claim 1, which comprises switching on the cooling device at a temperature at least as high as 350° C. in order to reduce the internal temperature.

5. Method according to claim 1, which comprises setting a maximum permissible internal temperature of 380° C. in the storage battery.

6. Method according to claim 1, which comprises setting the third given temperature value between 92 and 97% of a maximum permissible internal temperature in the storage battery.

7. Method according to claim 1, which comprises setting the desired first given temperature value to 350° C., setting the second given temperature value to 350° C., and setting the third given temperature value to 360° C.

* * * * *